Figures 1, 2:
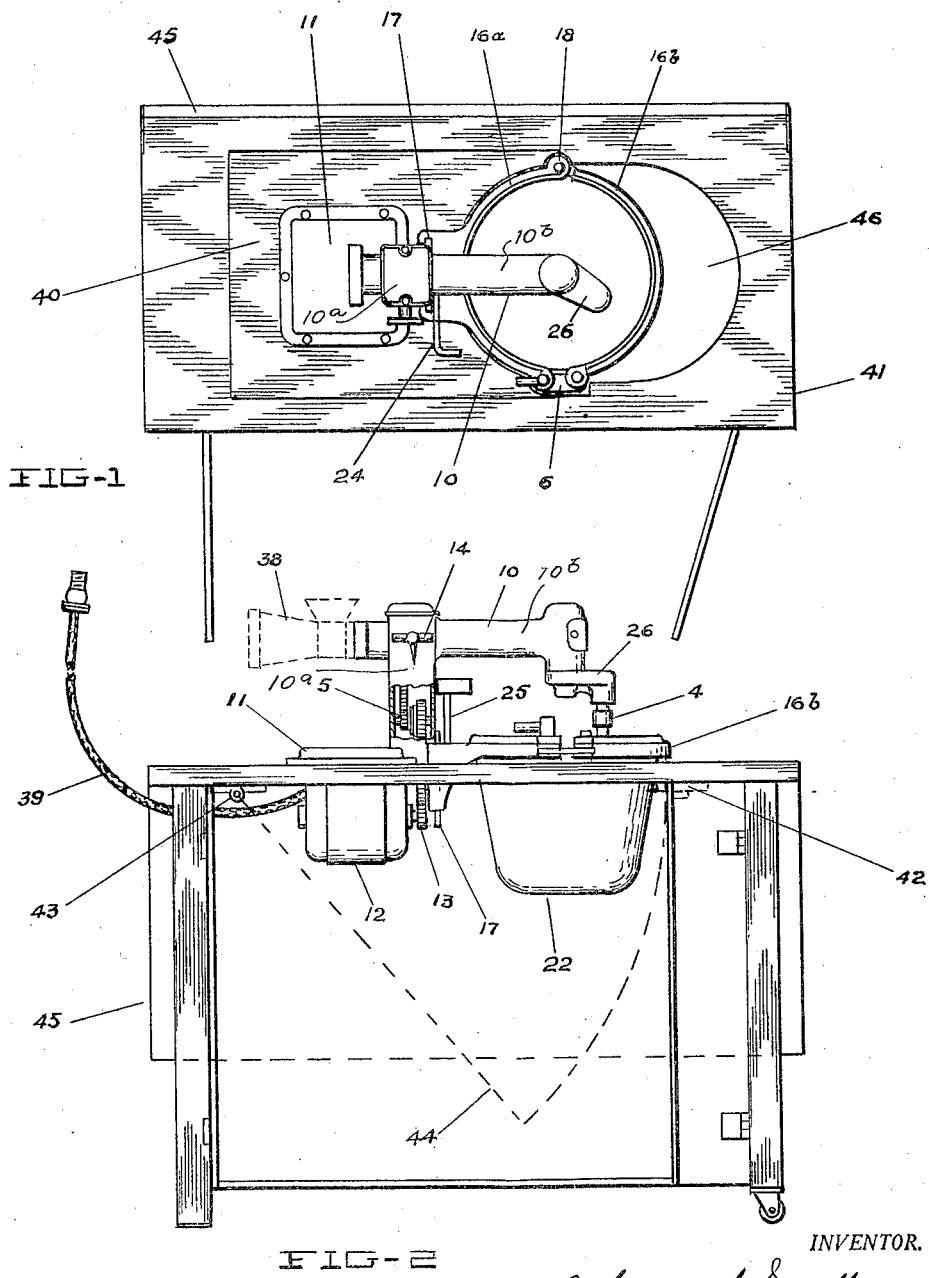

Oct. 26, 1926. 1,604,243
C. O. A. SMEDBERG
CULINARY MACHINE
Filed June 7, 1922 2 Sheets-Sheet 1

WITNESSES
INVENTOR.
Carl Oscar A. Smedberg.

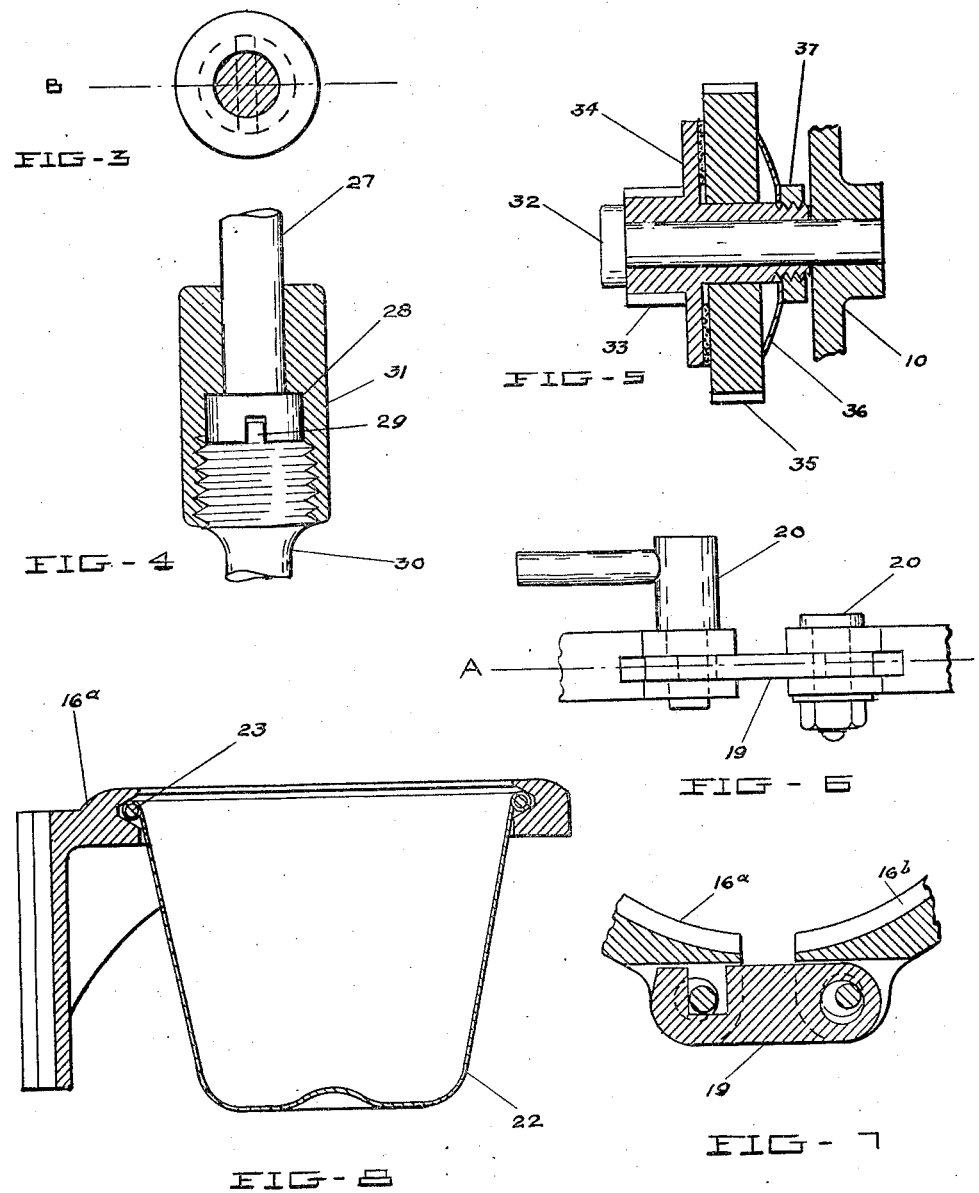

Patented Oct. 26, 1926.

1,604,243

UNITED STATES PATENT OFFICE.

CARL OSCAR AN SMEDBERG, OF CHICAGO, ILLINOIS.

CULINARY MACHINE.

Original application filed November 16, 1921, Serial No. 515,676. Divided and this application filed June 7, 1922. Serial No. 566,601.

My invention relates to improvements in culinary or kitchen machines intended to perform the heavy labor connected with kneading, mixing, whipping and chopping of food, and consists mainly in the arrangements of parts for transmission of power. Other features of my invention are included in my application of Nov. 16, 1921 Ser. No. 515,676 of which this is a division.
The object of this invention is to provide a practical and simple kitchen machine capable of doing most of the heavy work in the kitchen that can be done mechanically and mounted in such manner that it occupies no useful space when not in use. When in use, the driving means or motor is out of the way leaving a free working space and at the same time protected so children can safely be around. With these and other objects in view the invention consists in certain novel combinations and arrangements of parts as will more fully appear in the description, the novel features thereof being embraced in appended claims.
In the accompanying drawings, which form a part of this specification, similar figures refer to similar parts throughout the several views.

In the drawings, Fig. 1 is a top view of the machine mounted on a cabinet or table. Fig. 2 is a side elevation of Fig. 1. Fig. 3 is a horizontal section of a tool or beater holder and Fig. 4 is a vertical section of Fig. 3 taken at line B. Fig. 5 is a vertical section of a safety clutch, (indicated as 5, Fig. 2). Fig. 6 is an enlarged side view of bowl clamp lock, (indicated in Fig. 1 as 6). Fig. 7 is a horizontal section at line A, Fig. 6. Fig. 8 is a vertical section of the mixing bowl and holder, showing manner of holding the bowl.

In Figs. 1, and 2,—10 indicates the frame or gear housing provided with a mounting base 11, and a depending member 17, extending below said base. The housing 10 includes a hollow vertical pedestal 10ª from the top of which projects a horizontal overhanging supporting arm 10ᵇ. Underneath on said base is mounted a depending motor or driving means 12, in connection with gear train 13. This gear train is enclosed in the vertical pedestal 10ª of the housing 10, part of the housing being cut away at 5, to show gears and interposed safety device.
This safety device or clutch is shown in detail in Fig. 5. 14, is a handle operating a speed changing device (not shown) adapted to change the speed of the beaters or tools.

16ª, and 16ᵇ, constitute a bowl holder (also shown in Figs. 6, 7, 8). The two parts are hinged together as at 18, and locked as at 6, Fig. 1. This bowl holder is slidably mounted on dependent portion 17 of frame 10.

The safety device, Fig. 5, above referred to consists of a headed stud 32, one end of which is seated in and supported by one wall of the pedestal 10ª at the inside of the pedestal. On this stud is rotatably mounted a pinion and sleeve 33, having flange 34, and on said sleeve is a threaded nut 37 and spring 36. Between said spring and flange 34, is a gear wheel 35, rotatably held by a friction disc 34ª, interposed between the gear and flange 34. The nut and spring referred to serve to regulate the friction resistance as desired. When the power transmitted through the gear train reaches a prefixed resistance limit, a slippage between gear 35 and flange 34 will occur allowing the motor to run while the gears remain stationary, thus avoiding breakage and accidents.

The pedestal 10ª is vertically alined with the end of the armature shaft of the motor 12 with which the train of gearing 13 is engaged. This affords direct vertical drive from the motor, and effectually houses the gearing to protect the same and prevent injury of the operator by the gearing. It also establishes a compact arrangement between the motor 12 at the under side of the base 11 and the housing 10 at the upper side thereof, and thus economizes in the space required for the assembly of these parts.

Gear train 13, above referred to, rotates a shaft inside the gear housing 10, (not shown) which connects with and operates any apparatus as desired, for example such as indicated by dotted lines 38, and said gear train also rotates a vertical shaft (not shown) which in turn transmits planetary movement to another vertical shaft 27. The shaft 27 is eccentrically disposed at the outer end of a suitable planet gear housing 26 rotatably mounted on the main gear housing 10 and is provided at its lower end with a tool holder 4.

In Fig. 4 27 is the spindle or vertical shaft proper having a head 28 and keyway 29. 30 is the threaded end of a beater or tool shaft having a key across the end fitting into keyway 29. 31 is a sleeve rotatable on shaft 27 and having internal threads at the lower end adapted to receive the beater shaft and hold the two shafts together and rotate same in unison.

When the sleeve is unscrewed from the beater shaft the same can be removed sideways without lowering the bowl, which is a very desirable feature.

The machine is mounted on a dropleaf in a table or cabinet 41 and said leaf 40 is hinged to the table at 43 at one end and supported by clamps 42 at the other end. By turning said clamps, leaf 40 together with the machine, will take the position indicated by the dotted lines 44 Fig. 1 and be located wholly below the top of the table. A hinged leaf 45 is then folded over the top making it a serviceable table or cabinet with the machine handy when wanted.

In operation, the machine is raised to the position shown in Fig. 2. Bowl 22 with ingredients to be mixed or worked is placed in holder 16, the part 16$^b$ being swung outward allowing the bowl to be lowered into opening 46 in the table and moved into the holder, after which part 16$^b$ is clamped around the bowl. A suitable beater or tool with a shaft 30 is then inserted in the holder or sleeve 4 Fig. 2 (or 31 Fig. 4) which is then screwed on securely. The motor 12, being connected to electric current by cord 29, is now started rotating planet gear 26 and beater, the desired speed being obtained by turning handle 14.

When apparatus like that designated 38 is used, this apparatus being removable, the bowl and beater are omitted.

No claim is made herein to the cabinet structure, the bowl holder and those features other than the power drive, the same forming the subject-matter of another application filed by me November 16, 1921, Serial No. 515,676, of which the present application is a division.

I am aware that prior to my invention, food mixing machines have been made with planetary gears for mixing movements with speed change of same and lowering and raising the mixing bowl.

I therefore do not claim such a combination broadly; but I claim:—

1. In a machine of the class described, the combination with a base, of a gear-housing carried thereby and including a hollow vertical pedestal, a motor arranged at the under side of the base and depending from the same, said pedestal being vertically alined with one end of the armature shaft of said motor, a vertical train of gearing arranged within said pedestal and engaged with the armature shaft of said motor to provide a direct vertical drive from the motor, and tool-operating mechanism carried by the gear housing and operatively connected with said train of gearing to be driven thereby.

2. In a machine of the class described, the combination with a base, of a gear housing carried thereby and including a hollow vertical pedestal, a motor arranged at the under side of the base and depending from the same, said pedestal being vertically alined with one end of the armature shaft of said motor, a headed stud arranged at the interior of the pedestal and having one of its ends seated in and supported by one wall of the pedestal, a sleeved pinion rotatably mounted on said stud within the pedestal and provided with a flange, a gear-wheel rotatably mounted on the sleeve of said pinion, a friction disk interposed between said gear-wheel and said flange to provide for slippage therebetween when a prefixed resistance limit is reached, means for varying the frictional engagement between said gear-wheel and said flange, a vertical train of gearing between the armature shaft of said motor and said gear-wheel and affording a direct vertical drive from the motor, tool-operating mechanism carried by the gear housing, and operating connections between the sleeved pinion within the housing and said tool-operating mechanism for driving the latter.

In testimony whereof, I affix my signature.

CARL OSCAR AN SMEDBERG.